US011079977B2

(12) United States Patent
Miyajima et al.

(10) Patent No.: US 11,079,977 B2
(45) Date of Patent: Aug. 3, 2021

(54) PRINTING SYSTEM, INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventors: Jun Miyajima, Toride (JP); Akinori Takeo, Yokohama (JP); Seijiro Imai, Toride (JP); Masaki Kashiwagi, Hiratsuka (JP); Takeshi Kaneda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/572,321

(22) Filed: Sep. 16, 2019

(65) Prior Publication Data
US 2020/0097224 A1 Mar. 26, 2020

(30) Foreign Application Priority Data
Sep. 21, 2018 (JP) .............................. JP2018-177273

(51) Int. Cl.
G06F 3/12 (2006.01)
(52) U.S. Cl.
CPC ............ G06F 3/1205 (2013.01); G06F 3/126 (2013.01); G06F 3/1226 (2013.01)
(58) Field of Classification Search
CPC ....... G06F 3/1205; G06F 3/1226; G06F 3/126
USPC ...................................................... 358/1.14
See application file for complete search history.

(56) References Cited

U.S. PATENT DOCUMENTS

| 2013/0063776 A1* | 3/2013 | Kishida ................. G06F 3/1288 358/1.15 |
| 2013/0120784 A1* | 5/2013 | Takagi ............... H04N 1/00912 358/1.14 |
| 2016/0004491 A1* | 1/2016 | Amano ................. G06F 3/1285 358/1.14 |
| 2016/0216919 A1* | 7/2016 | Zakharov .............. G06F 3/1288 |

FOREIGN PATENT DOCUMENTS

JP 2005-165393 A 6/2005

\* cited by examiner

*Primary Examiner* — Allen H Nguyen
(74) *Attorney, Agent, or Firm* — Canon U.S.A., Inc. IP Division

(57) ABSTRACT

A printing system includes an image formation apparatus, an information processing apparatus, and a terminal apparatus. The terminal apparatus includes a reception unit configured to receive conditions of capabilities required for an image formation apparatus to be registered on a virtual printer, and a first transmission unit configured to transmit the conditions received by the reception unit to the information processing apparatus. The image formation apparatus includes a second transmission unit configured to transmit, to the information processing apparatus, capability information indicating a capability of the image formation apparatus. The information processing apparatus includes a registration unit configured to register the image formation apparatus on the virtual printer in a case where the capability indicated in the capability information transmitted by the second transmission unit satisfies the conditions transmitted by the first transmission unit.

11 Claims, 20 Drawing Sheets

FIG.8

```
SET ESSENTIAL CONDITION

801 — ☐ COLOR
802 — FINISHING  ☑ STAPLING   ☐ PUNCHING
803 — ☑ TWO-SIDED
804 — SIZE   ☑ A3   ☑ LEDGER
             ☑ A4   ☑ LETTER   ☑ LEGAL
805 — SPEED  [ 30 ] SHEETS/MIN. MACHINE
                    OR HIGHER
```

901 (CAPABILITY OF MFP 111)

COLOR: MONOCHROME MACHINE
FINISHING: STAPLING, PUNCHING SUPPORT
TWO-SIDED: LONG-SIDE, SHORT-SIDE BINDING SUPPORT
SHEET SIZE: A4, LETTER, A3, LEDGER
SPEED: 60 SHEETS/MIN.

902 (CAPABILITY OF MFP 112)

COLOR: COLOR MACHINE
FINISHING: NONE
TWO-SIDED: NONE
SHEET SIZE: A4, LETTER, LEGAL
SPEED: 20 SHEETS/MIN.

Internet Printing Protocol
   version: 2.0
   operation-id: Register-Output-Device Request
   request-id: 1
   operation-attributes-tag
      attributes-charset (charset): 'utf-8'
         name: attributes-charset
         charset value: 'utf-8'
      attributes-natural-language (naturalLanguage): 'en-us'
         name: attributes-natural-language
         naturalLanguage value: 'en-us'
      printer-uri (uri): 'ipp://XXXXX.local.:631/ipp/print'
         name: printer-uri
         uri value: 'ipp://XXXXX.local.:631/ipp/print'   ~1011

1020

Internet Printing Protocol
   version: 2.0
   operation-id: Get-Printer-Attributes (0x000b)
   request-id: 2
   operation-attributes-tag
      attributes-charset (charset): 'utf-8'
         name: attributes-charset
         charset value: 'utf-8'
      attributes-natural-language (naturalLanguage): 'en-us'
         name: attributes-natural-language
         naturalLanguage value: 'en-us'
      printer-uri (uri): 'ipp://www.example.com.:631/ipp/print'
         name: printer-uri
         uri value: 'ipp://www.example.com.:631/ipp/print'
      [truncated]requested-attributes:
         name: requested-attributes
         keyword value: 'color-supported'
         keyword value: 'finishings-supported'
         keyword value: 'sides-supported'   ~1021
         keyword value: 'media-supported'
         keyword value: 'pages-per-minute'

FIG.11

```
1110
Internet Printing Protocol
  version: 2.0
  status-code: Successful (successful-ok)
  request-id: 2
  operation-attributes-tag
    attributes-charset (charset): 'utf-8'
    attributes-natural-language (naturalLanguage): 'en-us'
  printer-attributes-tag                                          1111
    color-supported (boolean): false
    finishings-supported (enum): staple, punch
    sides-supported (1setOf keyword): 'one-sided','two-sided-long-edge','two-sided-short-edge'
    media-supported (1setOf keyword): 'iso_a4_210x297mm','na_letter_8.5x11in'
                                     ,'iso_a3_297x420mm','na_ledger_11x17in'
    pages-per-minute (integer): 60
```

```
1120
Internet Printing Protocol
  version: 2.0
  status-code: Successful (successful-ok)
  request-id: 2
  operation-attributes-tag
    attributes-charset (charset): 'utf-8'
    attributes-natural-language (naturalLanguage): 'en-us'
  printer-attributes-tag                                          1121
    color-supported (boolean): true
    finishings-supported (enum): none
    sides-supported (1setOf keyword): 'one-sided'
    media-supported (1setOf keyword): 'iso_a4_210x297mm','na_letter_8.5x11in','na_legal_8.5x14in'
    pages-per-minute (integer): 20
```

FIG.18

```
Internet Printing Protocol
   version: 2.0
   operation-id: Register-Output-Device Request
   request-id: 1
   operation-attributes-tag
      attributes-charset (charset): 'utf-8'
         name: attributes-charset
         charset value: 'utf-8'
      attributes-natural-language (naturalLanguage): 'en-us'
         name: attributes-natural-language
         naturalLanguage value: 'en-us'
      printer-uri (uri): 'ipp://XXXXX.local.:631/ipp/print'
         name: printer-uri
         uri value: 'ipp://XXXXX.local.:631/ipp/print'      ---1801
      force-regist-mode(boolean):true  ---1802
```

1800

FIG.19
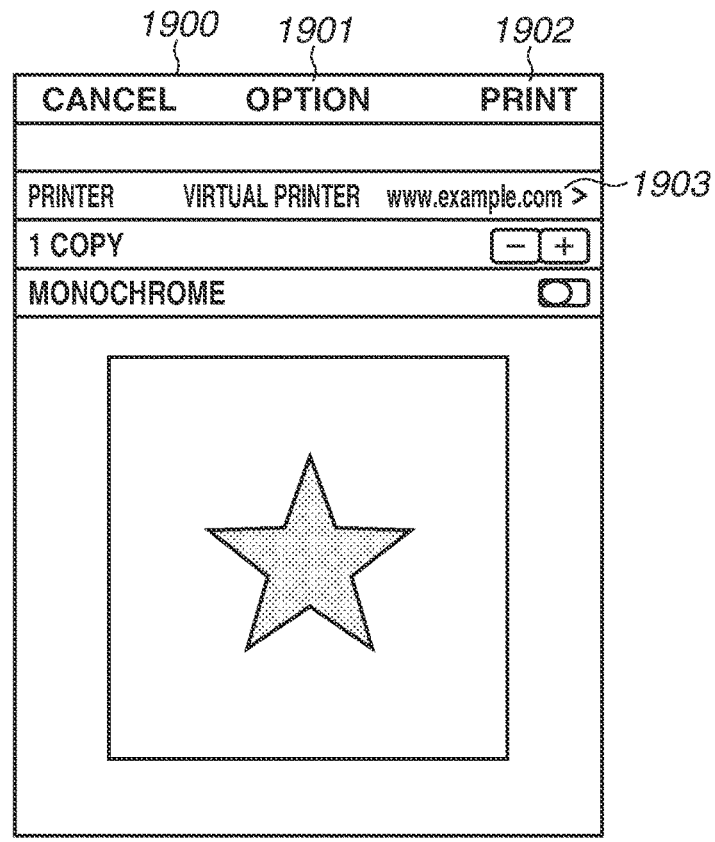
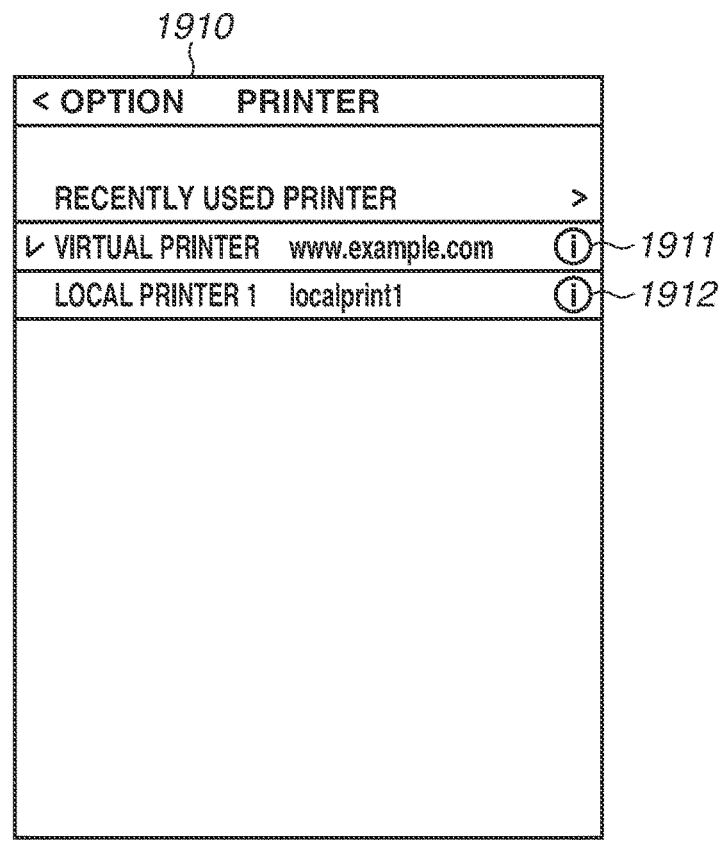

| | |
|---|---|
| < PRINTER | PRINTER INFORMATION |

| |
|---|
| VIRTUAL PRINTER  www.example.com |

| | |
|---|---|
| NAME | VIRTUAL PRINTER  www.example.com |
| LOCATION | OVER CLOUD ~1921 |
| URL | ipp://www.example.com/ipp/print ~1922 |
| PARTICIPATING PRINTER | MFP111 ~1923 |

PRINTING SYSTEM, INFORMATION PROCESSING APPARATUS, CONTROL METHOD THEREFOR, AND STORAGE MEDIUM

BACKGROUND

Field of the Disclosure

The present disclosure relates to a printing system, an information processing apparatus, a control method therefor, and a storage medium.

Description of the Related Art

Conventionally, there is known a printing system in which a plurality of image formation apparatuses such as multifunction peripherals is connected to a terminal apparatus such as a personal computer (PC) and print jobs generated by the terminal apparatus are shared by the plurality of image formation apparatuses to execute printing processing.

Japanese Patent Application Laid-Open No. 2005-165393 discusses a technology for such a printing system in which a server registers a plurality of printers as output devices, the server stores a print job transmitted from a terminal apparatus, and a printer is controlled to execute the print job stored in the server.

In the printing system as discussed in Japanese Patent Application Laid-Open No. 2005-165393, in a case where a user operates an image formation apparatus to cause the image formation apparatus to receive, from an information processing apparatus, a print job stored in the information processing apparatus such as a server and execute the print job, the following issues arise.

For example, when the capabilities (e.g., two-sided/one-sided printing, and supported sheet sizes) of a plurality of image formation apparatuses registered in the information processing apparatus differ for each image formation apparatus, the print job transmitted by the user from the terminal apparatus may not be able to be executed. In other words, there is a case where the capabilities of the image formation apparatus that the user has instructed to execute the print job are not sufficient for the print settings for the print job and the image formation apparatus is not able to execute the print job. Therefore, it is necessary for the user to check whether the image formation apparatus in which a print job is to be executed can execute the print job, which takes time and effort.

SUMMARY

Embodiments of the present disclosure are directed to reduction in the time and effort of a user when an image formation apparatus receives, from an information processing apparatus, a print job stored in the information processing apparatus to execute the print job, in response to a user operation.

According to embodiments of the present disclosure, a printing system includes an image formation apparatus, an information processing apparatus, and a terminal apparatus. The terminal apparatus includes a reception unit configured to receive conditions of capabilities required for an image formation apparatus to be registered on a virtual printer, and a first transmission unit configured to transmit the conditions received by the reception unit to the information processing apparatus. The image formation apparatus includes a second transmission unit configured to transmit, to the information processing apparatus, capability information indicating a capability of the image formation apparatus. The information processing apparatus includes a registration unit configured to register the image formation apparatus on the virtual printer in a case where the capability indicated in the capability information transmitted by the second transmission unit satisfies the conditions transmitted by the first transmission unit.

Further features of the present disclosure will become apparent from the following description of exemplary embodiments with reference to the attached drawings.

BRIEF DESCRIPTION OF THE DRAWINGS

FIG. 8 illustrates an example of a setting screen 800 for essential conditions displayed on an operating unit 406 of the terminal apparatus.

FIG. 9 illustrates examples of capability information about the MFP.

FIG. 10 illustrates examples of a message used for transmitting a printer registration request and a registration result notification in Internet Printing Protocol (IPP) communication between the cloud server 120 and the MFP.

FIG. 11 illustrates examples of a message used for transmitting capability information about the MFP in PP communication between the cloud server and the MFP.

FIG. 18 illustrates an example of a message used for transmitting a printer registration request in IPP communication between the cloud server and the MFP.

FIG. 19 illustrates an example of a print screen displayed on an operating unit of the terminal apparatus.

FIG. 20 illustrates an example of a print setting screen for displaying detailed information about a printer.

DESCRIPTION OF THE EMBODIMENTS

Exemplary embodiments of the present disclosure will be described below with reference to the drawings. Configurations described in the following exemplary embodiments are merely examples, and the present disclosure is not limited to the described configurations.

Figure 1:
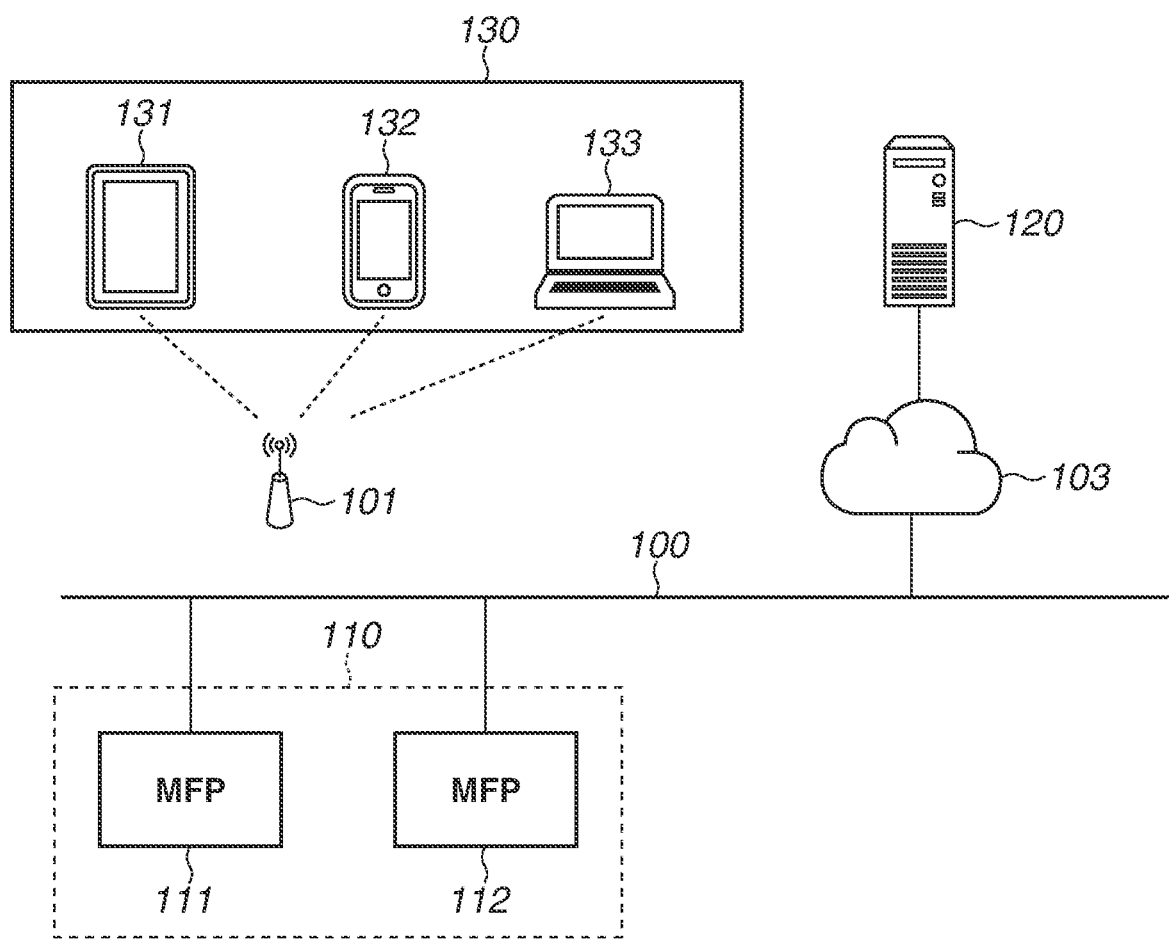
FIG. 1 is a schematic diagram illustrating an example of a configuration of a printing system.

First exemplary embodiment will be described. FIG. 1 illustrates an example of a configuration of a printing system. The printing system in FIG. 1 includes multifunction peripherals (MFPs) 111 and 112 serving as image formation apparatuses, a terminal apparatus 130 serving as an external apparatus, and a cloud server 120 serving as an information processing apparatus and operating as a virtual printer. The MFPs 111 and 112 are collectively referred to as an MFP 110. Terminal apparatuses 131, 132, and 133 are each, for example, an external apparatus such as a tablet, a smartphone, and a personal computer (PC). The terminal apparatuses 131, 132, and 133 are collectively referred to as the terminal apparatus 130.

The MFP 110 and the terminal apparatus 130 are connected to each other via an access point 101 connected to a local area network (LAN) 100. In the present exemplary embodiment, the terminal apparatus 130 is connected to the LAN 100 using wireless communication. However, the present disclosure is not limited to this, and the terminal apparatus 130 may be connected to the LAN 100 using, for example, wired communication.

The LAN 100 to which the MFP 110 and the terminal apparatus 130 are connected is connected to the Internet 103, and the MFP 110 and the terminal apparatus 130 can be connected to the cloud server 120 via the Internet 103.

Here, the printing processing capabilities of the MFPs 111 and 112 may be different from each other or the same.

In the present exemplary embodiment, the above configuration example is described as an example of the printing system. However, the present disclosure is not limited to this, and any configuration is possible as long as at least one terminal apparatus and the MFP are connected to the cloud server 120 via the LAN 100 and the Internet 103. The LAN 100 may be a wireless network or a wired network.

In the printing system, while the print job is not transmitted directly to the MFP 110 from the terminal apparatus 130, the print job is transmitted to the cloud server 120 via the Internet 103 once, and is stored on the cloud server 120. Then, the print job on the cloud server 120 is requested from the MFP 110, and the received print job is executed. Here, the print job is data including an instruction for causing the MFP 110 to execute printing processing, image data, and print setting information.

In the present exemplary embodiment, the above configuration example is described as an example of the printing system. However, the present disclosure is not limited to this, and any configuration is possible as long as at least one information processing apparatus and the image formation apparatus are connected via a network to be able to communicate with each other. The network may be wireless or wired.

Figure 2:
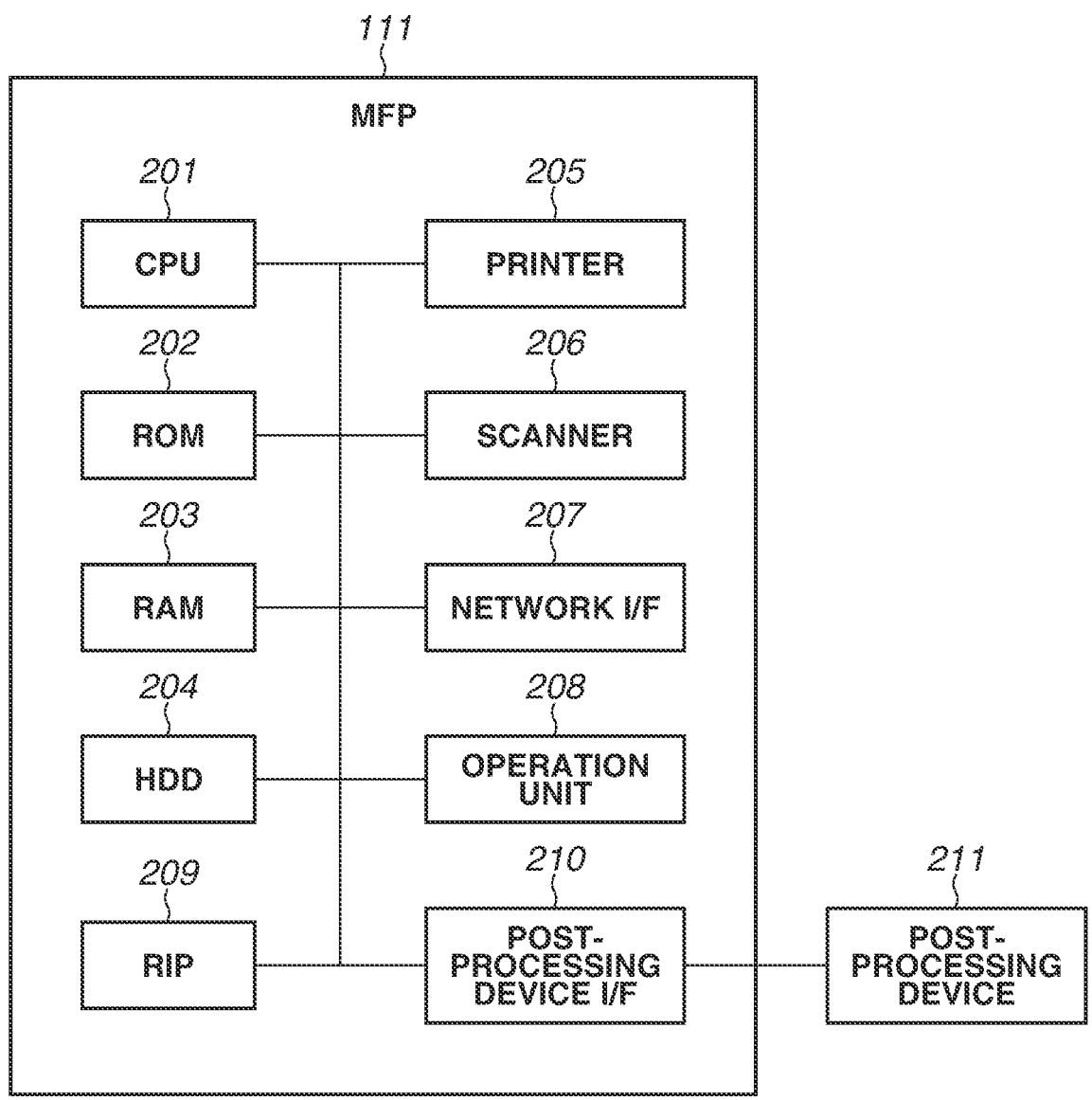
FIG. 2 is a block diagram illustrating an example of a hardware configuration of a multifunction peripheral (MFP).

FIG. 2 illustrates an example of a hardware configuration of the MFP 111. The MFP 111 includes a central processing unit (CPU) 201, a read-only memory (ROM) 202, a random-access memory (RAM) 203, a hard disk drive (HDD) 204, a printer 205, a scanner 206, a network interface (I/F) 207, and an operating unit I/F 208.

The MFP 111 also includes a raster image processor (RIP) 209.

The CPU 201 controls the various types of hardware units 204 to 208 included in the MFP 111 to implement each of the functions of the MFP 111. The CPU 201 transmits signals to the various types of hardware units 204 to 208 via a bus line to perform data communication with the another hardware unit, and vice versa.

The ROM 202 stores various kinds of data and programs used by the CPU 201. The RAM 203 is a work memory for temporarily storing a program and data used by the CPU 201 for an operation. The HDD 204 stores various kinds of data, various programs, and the like. The MFP 111 according to the present exemplary embodiment will be described as an example using an HDD as an auxiliary storage device. However, a nonvolatile memory such as a solid state drive (SSD) may be used for the auxiliary storage device.

The printer 205 is a unit for implementing a printing function, and performs processing of printing an image on a sheet based on image data included in a print job transmitted from the terminal apparatus 130 via the cloud server 120.

The scanner 206 is a unit for implementing a scanning function, and performs processing of optically reading an original to convert the original into image data.

The CPU 201 of the MFP 111 controls the operation of the MFP 111 in accordance with a control program in the MFP 111. More specifically, the CPU 201 executes an operating system (OS) for controlling the MFP 111 and a driver program for controlling a hardware interface. Application programs installed in the OS mutually operate to perform operation and control on functions desired by a user. The OS and various programs are stored in the ROM 202, and are loaded from the ROM 202 into the RAM 203 to be executed.

The network I/F 207 of the MFP 111 may be a LAN_I/F for wired connection, or may implement a connection using a universal serial bus (USB)—LAN adapter. The network I/F 207 may be a LAN_I/F for wireless connection.

The network I/F 207 of the MFP 111 is connected to the cloud server 120 via the LAN 100 and the Internet 103.

The operating unit 208 is a user interface for a user who uses the MFP 111 to use the functional units such as the printer 205 and the scanner 206, and receives operation and input by serving as, for example, a touch panel. The operating unit 208 can also be used as a display unit configured to display information about the MFP 111. The MFP 111 according to the present exemplary embodiment may be connected to an external operation device and an external display device.

The RIP 209 is a hardware module for performing rasterization processing of generating a raster image from a page description language (PDL) script. Although an example in which the RIP 209 is incorporated as hardware is described in the present exemplary embodiment, the RIP 209 may be stored in the ROM 202 as software.

Although the hardware configuration of the MFP 111 has been described with reference to FIG. 2, the hardware configuration of the MFP 112 may be similar to that of the MFP 111. For example, as long as the image formation apparatus is a specific image formation apparatus capable of Internet Printing Protocol (IPP) communication, in which IPP is a printing protocol, any image formation apparatus having a different performance of CPU, RAM, or the like or different supported sizes of printable sheets may be employed.

In the MFP 111 according to the present exemplary embodiment, one CPU 201 executes each processing illustrated in the flowchart described below using one memory (RAM 203), but another aspect may be performed. For example, a plurality of CPUs, RAMs, ROMs, and storages may be cooperated to execute each processing illustrated in the flowchart described below. The processing may be partially performed using a hardware circuit such as an application specific integrated circuit (ASIC) or a field-programmable gate array (FPGA).

A post-processing device I/F 210 connects the MFP 111 and a post-processing device 211. The post-processing device 211 receives a control command indicating an instruction of punching, stapling, or the like from the CPU 201, and performs post-processing on a sheet on which an image has been printed by the printer 205 according to the control command.

Figure 3:
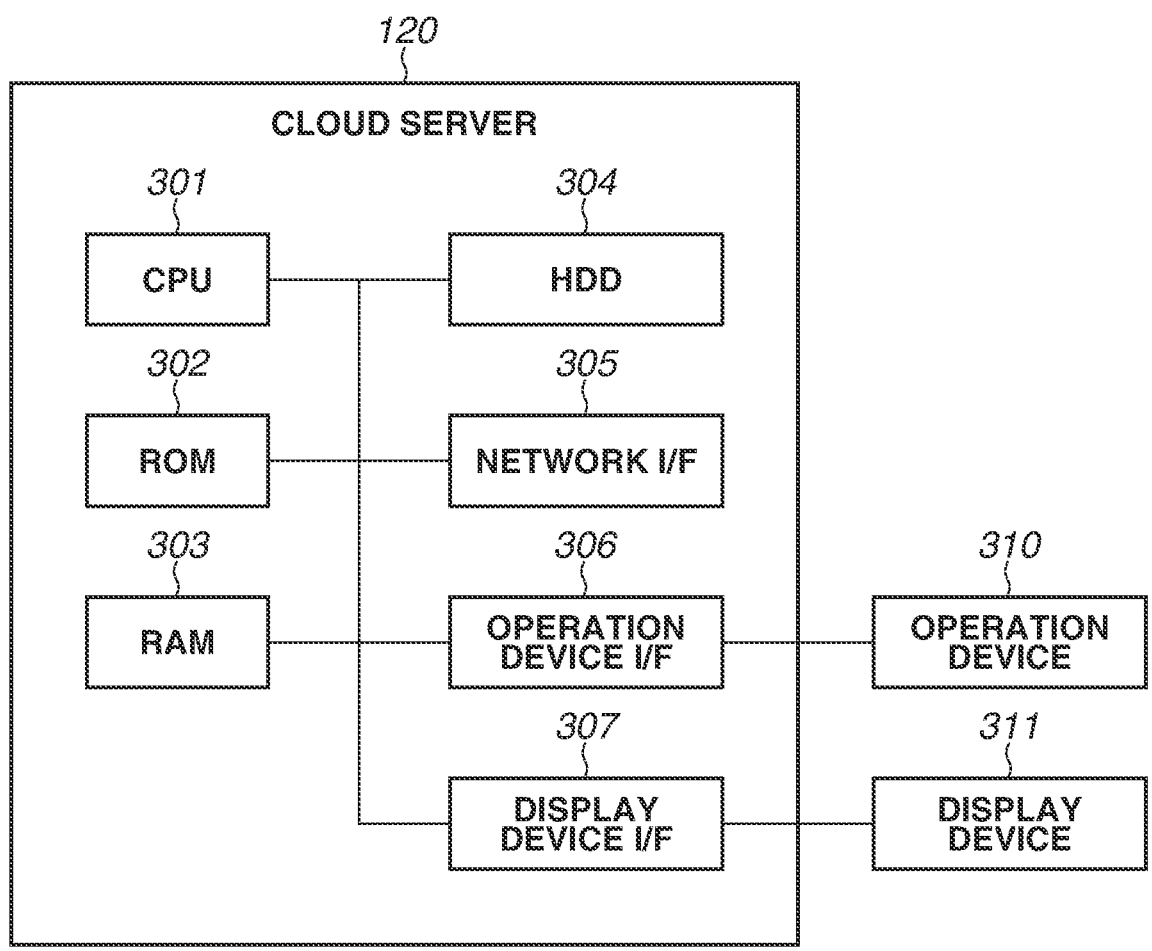
FIG. 3 is a block diagram illustrating an example of a hardware configuration of a cloud server.

FIG. 3 illustrates an example of a hardware configuration of the cloud server 120.

The virtual printer (cloud server) 120 includes a CPU 301, a ROM 302, a RAM 303, an HDD 304, a network I/F 305, an operation device I/F 306, and a display device I/F 307.

The CPU 301 controls the various types of hardware units 304 to 307 included in the cloud server 120 to implement each of the functions of the cloud server 120. The CPU 301 transmits signals to the various types of hardware units 304 to 307 via a bus line to perform data communication with the another hardware unit, and vice versa.

The ROM 302 stores various kinds of data and programs used by the CPU 301. The RAM 303 is a work memory for temporarily storing a program and data used by the CPU 301 for an operation. The HDD 304 stores, for example, various kinds of data and various programs. The cloud server 120 according to the present exemplary embodiment will be described as an example using an HDD as an auxiliary storage device. However, a nonvolatile memory such as an SSD may be used for the auxiliary storage device.

The network I/F 305 may be a LAN_I/F for wired connection, or may implement a connection using a USB-LAN adapter. The network I/F 305 may be a LAN_I/F for wireless connection.

The network I/F 305 is connected to the MFP 110 and the terminal apparatus 130 via the LAN 100 and the Internet 103.

The operation device I/F 306 is an I/F for connecting the cloud server 120 and an operation device 310 such as a keyboard or a mouse.

The display device I/F 307 is an I/F for connecting the cloud server 120 and a display device 311 such as a display.

Figure 4:
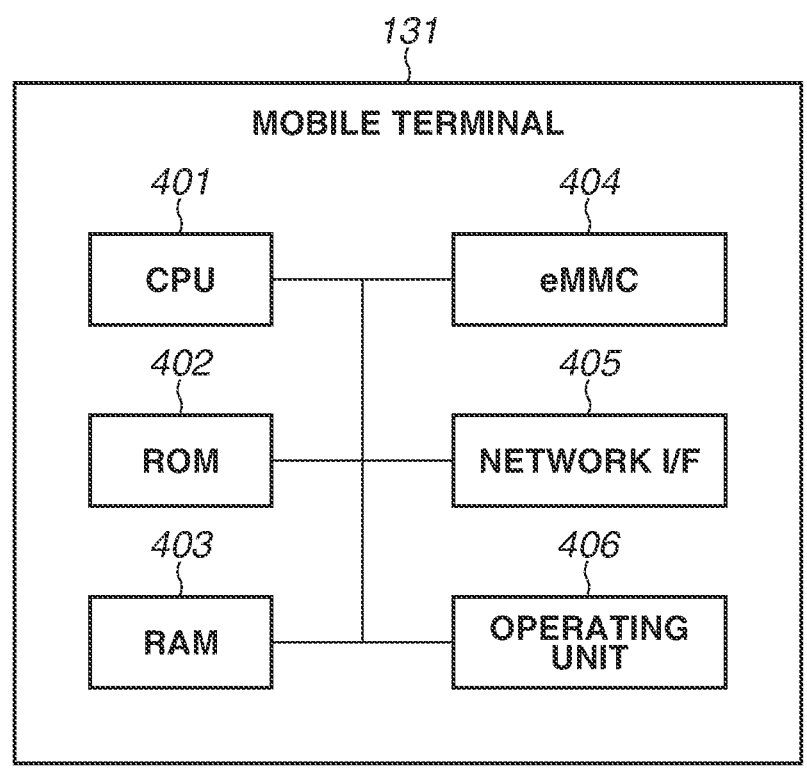
FIG. 4 is a block diagram illustrating an example of a hardware configuration of a terminal apparatus.

FIG. 4 illustrates an example of a hardware configuration of the terminal apparatus 131. The terminal apparatus 131 includes a CPU 401, a ROM 402, a RAM 403, an embedded multimedia card (eMMC) 404, a network I/F 405, and an operating unit 406.

The CPU 401 controls the various types of hardware units 404 to 406 included in the terminal apparatus 131 to implement each of the functions of the terminal apparatus 131. The CPU 401 transmits signals to the various types of hardware units 404 to 406 via a bus line to perform data communication with the another hardware unit, and vice versa.

The ROM 402 stores various kinds of data and programs used by the CPU 401. The RAM 403 is a work memory for temporarily storing a program and data used by the CPU 401 for an operation. The eMMC 404 stores various kinds of data, various programs, and the like.

The network I/F 405 may be a LAN_I/F for wired connection, or may implement a connection using a USB-LAN adapter. The network I/F 405 may be a LAN_I/F for wireless connection.

The network I/F 405 is connected to the cloud server 120 via the LAN 100 and the Internet 103.

The operating unit 406 is a user interface for a user who uses the terminal apparatus 131, and receives operation and input by serving as, for example, a touch panel. The operating unit 406 can also be used as a display unit configured to display information about the terminal apparatus 131. The terminal apparatus 131 according to the present exemplary embodiment may be connected to an external operation device and an external display device.

Although the hardware configuration of the terminal apparatus 131 is described with reference to FIG. 4, the hardware configurations of the terminal apparatuses 132 and 133 may be similar to that of the terminal apparatus 131, or the terminal apparatuses 132 and 133 may have the other different configurations as long as IPP communication is possible.

Figure 5:
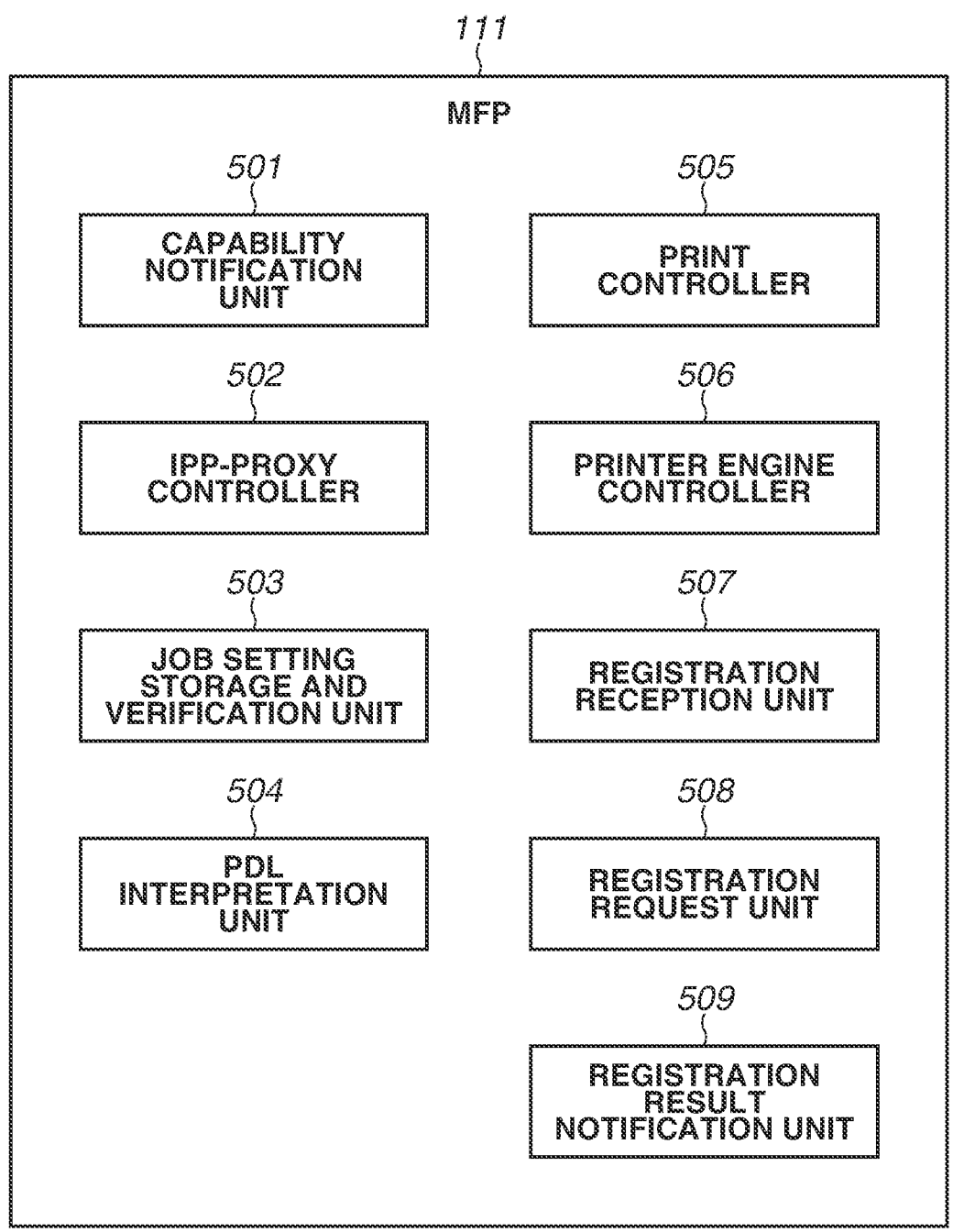
FIG. 5 is a block diagram illustrating an example of a software configuration of the MFP.

FIG. 5 illustrates an example of a software configuration of the MFP 111.

The CPU 201 executes a capability notification unit 501 to transmit capability information about the MFP 111 to the virtual printer 120. Examples of the capability information are as follows: "copies-supported" which indicates the number of copies to be printed; "document-format-supported" which indicates the supported format; and "feed-orientation-supported" which indicates information about the optimal feed direction.

The CPU 201 of the MFP 111 executes an IPP-Proxy controller 502 to receive data such as a print job from the cloud server 120 through IPP communication.

The CPU 201 executes a job setting storage and verification unit 503 to verify the attribute of the received print job, and stores the attribute in the RAM 203. Specifically, the CPU 201 confirms a print setting included in the print job, and store the setting in the RAM 203. For example, the number of print copies, executable finishing processing, PDL format information, and the like are confirmed and stored.

The CPU 201 executes a PDL interpretation unit 504 to interpret rendering data included in the received print job. The CPU 201 also controls the RIP 209 to perform rasterization processing. The PDL interpretation unit 504 according to the present exemplary embodiment supports the Printer Working Group (PWG)—Raster format.

The CPU 201 executes a print controller 505 to color-separate rasterized image data into red, green, and blue (RGB) components.

The CPU 201 executes a printer engine controller 506 to control the printer 205 and perform printing processing for each page based on the image data color-separated into RGB components and the print setting.

The CPU 201 executes a registration reception unit 507 to display, on the operating unit 208, a screen for registering a virtual printer on which the MFP 111 is registered. The screen is, for example, a participation registration screen 1300 illustrated in FIG. 13. Details of the participation registration screen 1300 will be described below.

The CPU 201 executes a registration request unit 508 to transmit a registration request (Register-Output-Device Request) to the virtual printer registered on the participation registration screen 1300.

The CPU 201 executes a registration result notification unit 509 to display a registration result on a screen of the operating unit 208 based on information indicating the registration result transmitted from the virtual printer to which the registration request has been transmitted. The screen displayed at that time is a screen such as a participation registration screen 1310 or 1320.

Figure 6:
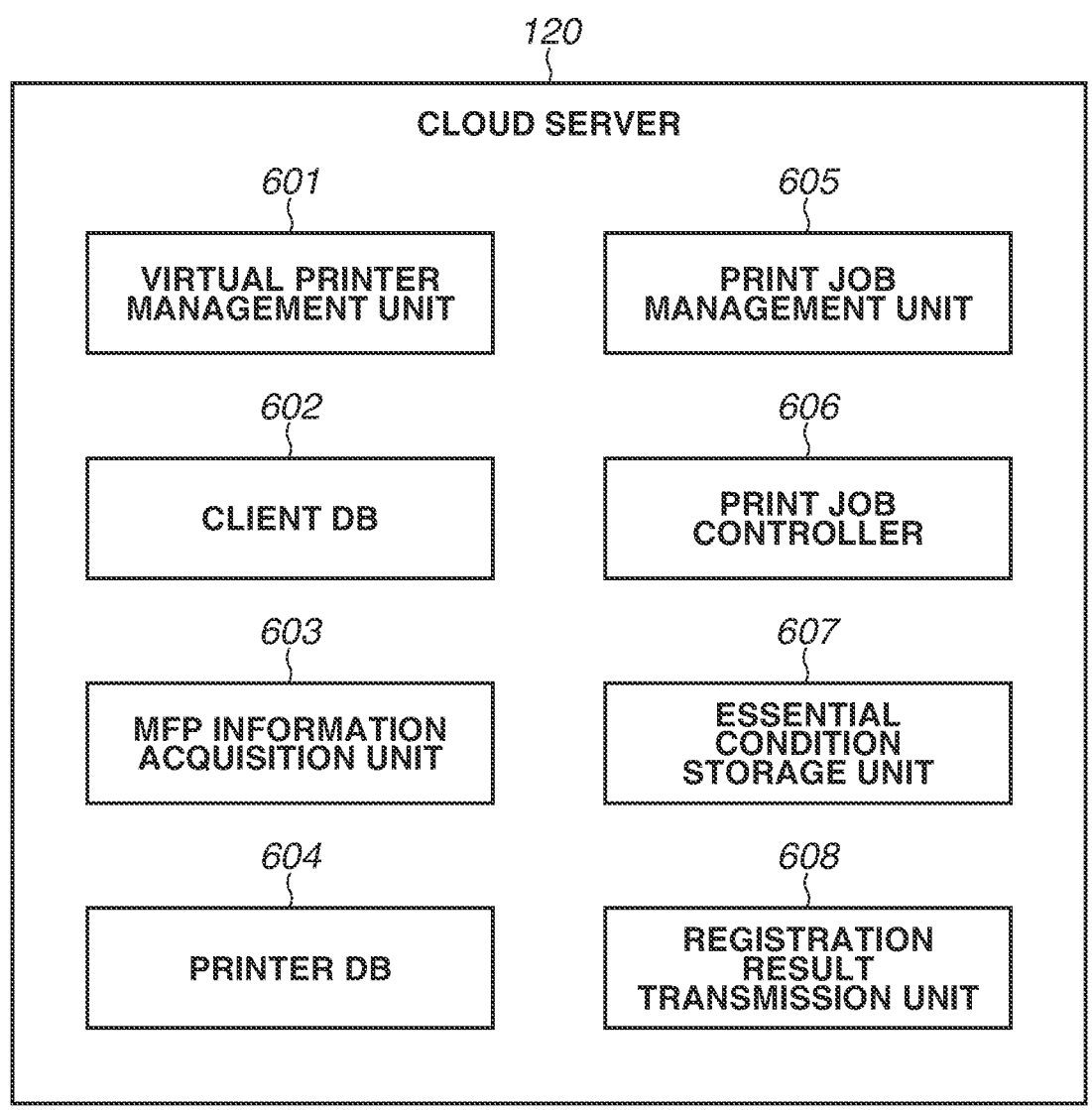
FIG. 6 is a block diagram illustrating an example of a software configuration of the cloud server.

FIG. 6 illustrates an example of a software configuration of the cloud server 120.

The CPU 301 executes a virtual printer management unit 601 to store, in a client DB 602 in the HDD 304, client information such as the IP address and port number of the terminal apparatus 130 received through IPP communication.

The CPU 301 executes an MFP information acquisition unit 603 to receive MFP information from the MFP 110 through IPP communication, and store the MFP information in a printer DB 604 in the HDD 304. The MFP information includes the identifier of the MFP, the capability information about the MFP, the name of the MFP, and the like. At that time, the identifier of the virtual printer may be stored in association with the MFP information.

The CPU 301 executes a print job management unit 605 to store the print job received from the terminal apparatus 130 in a predetermined area of the HDD 304. Here, the identifier of the virtual printer selected by the terminal apparatus 130 by the user and the identifier of the print job are associated with each other and stored in the HDD 304.

The CPU 301 executes a print job controller 606 to transmit the print job stored in the predetermined area of the HDD 304 to the MFP 110 in response to receiving the print job request from the MFP 110 through the IPP communication.

The CPU 301 executes an essential condition storage unit 607 to store capability information being an essential condition received from the terminal apparatus 130 in the HDD 304.

The CPU 301 executes a registration result transmission unit 608 to transmit, to the MFP 110, a result of comparison between the capability information being the essential condition and the received capability information.

In the conventional printing system, when the capabilities (e.g., two-sided/one-sided printing, and supported sheet sizes) of a plurality of image formation apparatuses registered in the information processing apparatus differ for each image formation apparatus, the print job transmitted by the user from the terminal apparatus may not be able to be executed. In other words, there is a case where the capabilities of the image formation apparatus that the user has instructed to execute the print job are not sufficient for the print settings for the print job and the image formation apparatus is not able to execute the print job. Therefore, it is necessary for the user to check whether the image formation apparatus in which a print job is to be executed can execute the print job, which takes time and effort.

In order to solve the issue, the present exemplary embodiment performs the following processing to make it possible to reduce the time and effort of the user when the image formation apparatus receives the print job stored in the information processing apparatus from the information processing apparatus to execute the print job, in response to a user operation.

Figure 7:
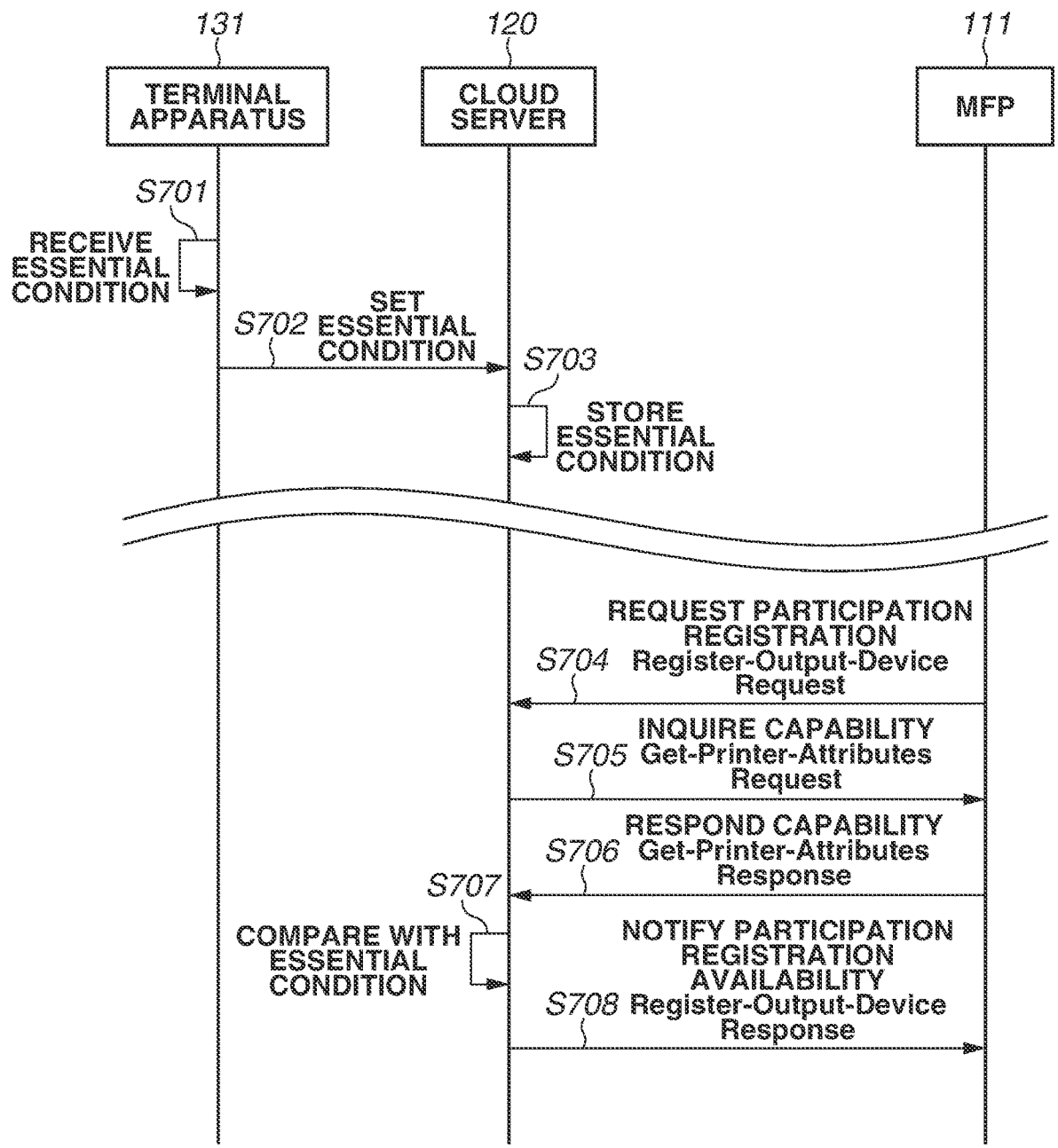
FIG. 7 is a flow diagram illustrating an example of a sequence to register information about the MFP on a virtual printer.

FIG. 7 illustrates an example of a sequence to register the information about the MFP 111 on the virtual printer. This sequence is started when the cloud server 120 receives an instruction to set a printer registration condition in response to a user operation on the terminal apparatus 131. This sequence is implemented by each apparatus performing the IPP communication.

In step S701, the CPU 401 of the terminal apparatus 131 receives essential conditions for registering an MFP on the virtual printer in response to receiving a user operation on a setting screen 800 in FIG. 8. The essential conditions are information indicating the minimum capabilities to be satisfied by an MFP to be registered on the virtual printer.

In step S702, the CPU 401 of the terminal apparatus 131 transmits, to the cloud server 120, information indicating the essential conditions for printer registration instructed by the user.

In step S703, the CPU 301 of the cloud server 120 stores the received information indicating the essential conditions in the RAM 203.

Next, in step S704, the CPU 201 of the MFP 111 transmits a printer registration request (Register-Output-Device Request) to the cloud server 120 when the user instructs registration through the participation registration screen 1300 displayed on the operating unit 208. Details of the participation registration screen 1300 of FIG. 13 will be described below.

In step S705, the CPU 301 of the virtual printer transmits information (Get-Printer-Attributes Request) indicating a request for the capability information about the MFP 111, to the MFP 111 that has transmitted the registration request. The capability information is information indicating functions supported by the MFP 110. The functions (capabilities) supported by the MFP 110 include, for example, "possibility of two-sided printing", "supported sheet sizes", and "post-processing capability".

In step S706, the CPU 201 of the MFP 111 that has received the information indicating the request for the capability information transmits the capability information about the MFP 111 to the cloud server 120 as a response (Get-Printer-Attributes Response). In the present exemplary embodiment, the MFP 110 transmits the capability information to the cloud server 120 in response to receiving the request for the capability information from the cloud server 120, but the present disclosure is not limited to this. For example, the MFP 110 may transmit the registration request and the capability information together to the virtual printer. In that case, the cloud server 120 may perform the following processing on the capability information received together with the registration request without transmitting the request for the capability information.

In step S707, the CPU 301 of the cloud server 120 compares the essential conditions (capability information) stored in step S703 with the capability information about the MFP 111 received in step S706. Here, the CPU 301 determines whether the capability information being the essential conditions is included in the received capability information. For example, if the capability information being the essential conditions indicates "A4" and "two-sided printing available" and the received capability information indicates "A4, A3" and "two-sided printing available", it is determined that the capability information being the essential conditions is included in the received capability information.

In step S708, the CPU 301 of the cloud server 120 transmits, to the MFP 111, information indicating the availability of printer registration based on the result of the comparison in step S707. If the capability information being the essential conditions is included in the received capability information in step S707, information indicating that printer registration is available is transmitted to the MFP 111. If the capability information being the essential conditions is not included in the received capability information in step S707, information indicating that printer registration is not available is transmitted to the MFP 111.

FIG. 8 illustrates an example of the setting screen 800 for the essential conditions displayed on the operating unit 406 of the terminal apparatus 131.

The setting screen 800 is a screen for setting the conditions of capabilities of the MFP 111 to be registered on the virtual printer.

An item for color 801 is an item for setting whether the MFP to be registered on the virtual printer 120 needs to support color printing. If the check box is checked, only MFPs supporting color printing can be registered on the virtual printer.

An item for finishing 802 is an item for setting whether the MFP to be registered on the virtual printer needs to support stapling and/or punching which are post-processing capabilities. If the check box for stapling is checked, only MFPs supporting stapling can be registered on the virtual printer. If the check box for punching is checked, only MFPs supporting punching can be registered on the virtual printer.

An item for two-sided 803 is an item for setting whether the MFP to be registered on the virtual printer needs to support two-sided printing. If the check box is checked, only MFPs supporting two-sided printing can be registered on the virtual printer.

An item for size 804 is an item for setting whether the MFP to be registered on the virtual printer needs to support sizes of A3, A4, LETTER, and others. If the check box for each size is checked, only MFPs supporting the corresponding size can be registered on the virtual printer. In FIG. 8, the check boxes for all the sizes of A3, LEDGER, A4, LETTER, and LEGAL are selected. That is, this indicates that the MFP 110 registered on this virtual printer needs to support all the paper sizes of A3, LEDGER, A4, LETTER, and LEGAL.

An item for speed 805 is an item for setting whether the MFP to be registered on the virtual printer needs to support the printing speed designated by the user. Only MFPs capable of performing printing at a printing speed equal to or higher than the numerical value entered here can be registered on the virtual printer.

FIG. 9 illustrates examples of the capability information about the MFP 110. Capability information 901 indicates capability information about the MFP 111. The capability information is information indicating functions supported by the MFP 111. The MFP 1 has the capabilities of being capable of: color output of only "monochrome" printing, finishing processing of "stapling and punching", and two-sided printing of "long-side binding and short-side binding". In addition, the indicated capabilities include supported sheet sizes of "A4, LETTER, A3, and LEDGER" sheets, and a printing speed of 60 sheets/min.

Capability information 902 indicates capability information about the MFP 112. The MFP 112 has capabilities of being capable of: color output of "monochrome and color", finishing processing of "none", two-sided printing of "none", and supported paper sizes of "A4, LETTER, and LEGAL" sheets. In addition, the indicated capabilities include a printing speed of 20 sheets/min.

Figure 12:
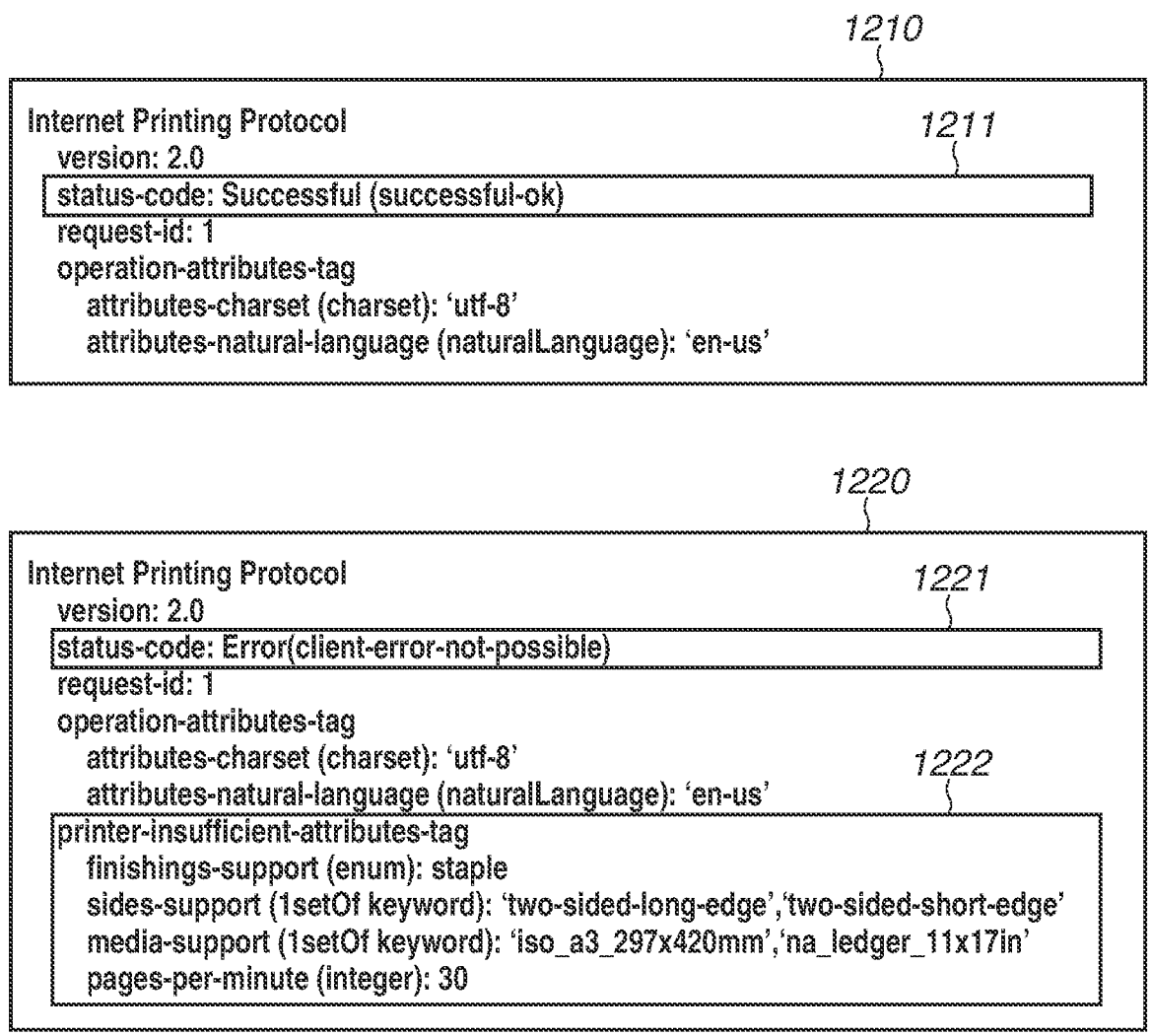
FIG. 12 illustrates examples of a message for a registration result notification (Register-Output-Device Response) transmitted by the cloud server to the MFP in IPP communication between the cloud server and the MFP.

FIGS. 10 to 12 illustrate examples of messages which are exchanged between the MFP 110 and the cloud server 120 in IPP communication.

FIG. 10 illustrates examples of a message used for transmitting a printer registration request and a registration result notification in IPP communication between the cloud server 120 and the MFP 110.

A message 1010 is an example of a message used when the MFP 110 transmits a registration request (Register-Output-Device Request) to the cloud server 120. This message corresponds to the request transmitted in step S704. The message is composed of header information about the HTTP layer and IPP message data on the HTTP.

In IPP message data 1011, "ipp://XXXXX.local.: 631/ipp/printer" indicates an identifier of the MFP 110. The cloud server 120 transmits the request for capability information and the registration availability notification to the MFP 110 corresponding to the identifier in the IPP message data 1011.

A message 1020 is an example of a message used when the cloud server 120 issues the request for capability information (Get-Printer-Attributes Request) to the MFP 110. This message 1020 corresponds to the request transmitted in step S705.

IPP message data 1021 indicates the type of capability information requested to the MFP 110. In the IPP message data 1021, "keyword value: 'color-supported'" is a keyword for requesting the availability of color printing, and "keyword value: 'finishings-supported'" is a keyword for requesting the presence or absence of finishing support. In the IPP message data 1021, "keyword value: 'sides-supported'" is a keyword for requesting the presence or absence of two-sided printing support, and "keyword value: 'media-supported'" is a keyword for requesting the type of supported paper. In addition, "keyword value: 'pages-per-minute'" indicates a printing speed (sheets/min).

FIG. 11 illustrates examples of a message used for transmitting capability information about the MFP 110 in IPP communication between the cloud server 120 and the MFP 110.

A message 1110 is an example of a message used when the MFP 111 transmits capability information (Get-Printer-Attributes Response) as a response to the cloud server 120. This message corresponds to the capability information transmitted in step S706.

IPP message data 1111 in the message 1110 indicates the capability information about the MFP 111. In the IPP message data 1111, "color-supported (boolean): false" indicates that only monochrome printing is available. In the IPP message data 1111, "finishings-supported (enum): staple, punch" indicates that finishing processes of stapling and punching are available. In the IPP message data 1111, "sides-supported (1setOf keyword): 'one-sided', 'two-sided-long-edge', 'two-sided-short-edge'" indicates that long-side binding and short-side binding are available in two-sided printing. The following indicates that paper sizes of A4, LETTER, A3, and LEDGER are supported: "media-supported (1setOf keyword): 'iso_a4_210×297 mm', 'na_letter_8.5×11 in', 'iso_a3_297×420 mm', 'na_ledger_11×17 in'". In the IPP message data 1111, "pages-per-minute (integer): 60" indicates a printing speed of 60 sheets/min.

A message 1120 is an example of a message used when the MFP 112 transmits capability information (Get-Printer-Attributes Response) as a response to the cloud server 120. This message corresponds to the capability information transmitted in step S706.

IPP message data 1121 in the message 1120 indicates the capability information about the MFP 112. In the IPP message data 1121, "color-supported (boolean): true" indicates that monochrome printing and color printing are available. In the IPP message data 1121, "finishings-supported (enum): none" indicates that finishing processing is not available. In the IPP message data 1121, "sides-supported (1setOf keyword): 'one-sided'" indicates that two-sided printing is not available.

The following indicates that paper sizes of A4, LETTER, and LEGAL are supported: "media-supported (1setOf keyword): 'iso_a4_210×297 mm', 'na_letter_8.5×11 in', 'na_legal_8.5×14 in'". In the IPP message data 1121, "pages-per-minute (integer): 20" indicates a printing speed of 20 sheets/min.

FIG. 12 illustrates examples of a message for a registration result notification (Register-Output-Device Response) transmitted by the cloud server 120 to the MFP 110 in IPP communication by the cloud server 120 to the MFP 110. This message corresponds to information indicating that the printer registration transmitted in the processing of step S708 is possible.

A message 1210 is an example of a message for a registration result notification (Register-Output-Device Response) transmitted by the cloud server 120 to the MFP 110.

IPP message data 1211 "status-code: Successful (successful-ok)" in the message 1210 indicates that the cloud server 120 has registered the MFP as one printer for the cloud server 120.

A message 1220 is an example of a message for a registration result notification (Register-Output-Device Response) transmitted by the cloud server 120 to the MFP 110. This message corresponds to information indicating that the printer registration transmitted in the processing of step S708 is not possible.

IPP message data 1221 "status-code: Error (client-error-not-possible)" indicates that the cloud server 120 has not registered the MFP as one of the virtual printers 120.

In addition, IPP message data 1222 indicate the capability required for the cloud server 120 to register the MFP 110 as one of the virtual printers. In other words, it indicates an insufficient capability as compared with the capability that is an essential condition set for the virtual printer. In the IPP message data 1222, "finishings-support (enum): staple" indicates that finishing processing of stapling is not supported. In the IPP message data 1222, "sides-support (1setOf keyword): 'two-sided-long-edge', 'two-sided-short-edge'" indicate that long-side binding and short-side binding in two-sided printing are not supported. In the IPP message data 1222, "media-support (1setOf keyword): 'iso_A3_297×420 mm', 'na_ledger_11×17 in'" indicates that paper sizes of A3 and LEDGER are not supported. In the IPP message data 1222, "pages-per-minute(integer): 30" indicates a printing speed of 30 sheets/min, which is not sufficient.

Figure 13:
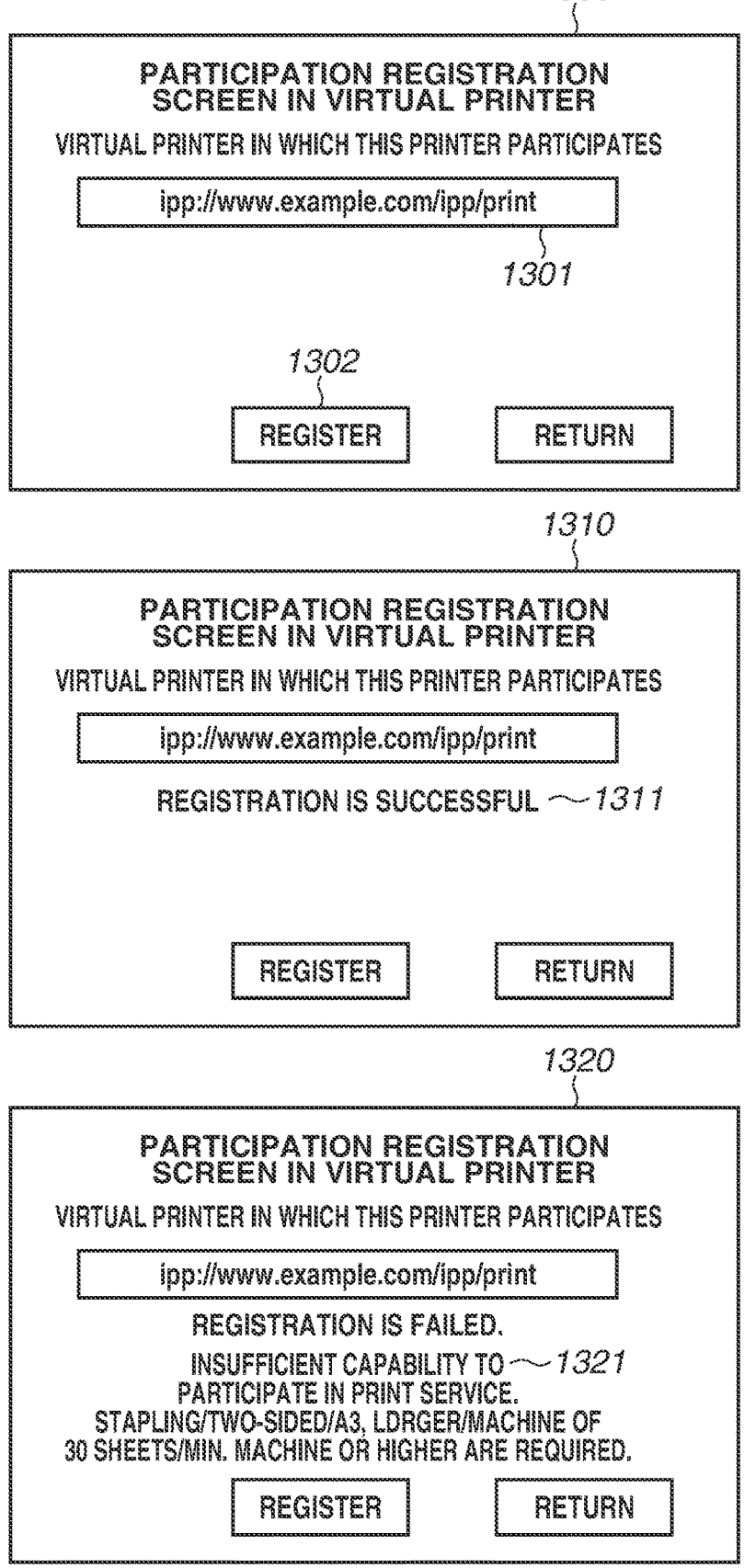
FIG. 13 illustrates examples of a participation registration screen displayed on an operating unit of an MFP.

FIG. 13 illustrates examples of a participation registration screen displayed on the operating unit 208 of the MFP 111.

The participation registration screen 1300 is a screen for the user to register a virtual printer in which the MFP 110 participates via the operating unit 208. The participation registration screen 1300 is displayed when the CPU 201 executes the processing of step S704.

In an input field 1301, Uniform Resource Locator (URL) "ipp://www.example.com/ipp/print", which is the identifier of a virtual printer in which the MFP 110 participates, is entered in response to receiving a user operation. In the input field 1301, an identifier may be directly entered through a user operation using, for example, a software keyboard, or an identifier may be selected from an identifier history in which identifiers entered in the past are stored, to be entered. The identifier to be entered in the input field is not limited to a URL, and may be, for example, a Uniform Resource Identifier (URI), an Internet Protocol (IP) address, or a MAC address.

When a registration button 1302 is selected by the user, the MFP 110 transmits a printer registration request to the cloud server 120 based on the identifier (such as a URL) entered in the input field 1301. This processing corresponds to the processing of step S704.

The participation registration screen 1310 is a screen displayed when the registration button 1302 is selected by the user, and the MFP 110 transmits the registration request to the cloud server 120 and then receives, from the cloud server 120, information indicating that registration for the virtual printer is possible (registration has been completed).

A comment 1311 is a text displayed when the MFP 110 receives, from the cloud server 120, information indicating that registration on the virtual printer is possible (registration has not been completed).

The participation registration screen 1320 is a screen displayed when the registration button 1302 is selected by the user, and the MFP 110 transmits the registration request to the cloud server 120 and then receives information indicating that registration on the virtual printer is not possible (registration has not been completed).

A comment 1321 is a text displayed when the MFP 110 receives, from the cloud server 120, information indicating that registration on the virtual printer is not possible (registration has not been completed). The comment 1321 displays failure of registration on the virtual printer and insufficient functions which are the cause of the failure.

Only the administrator user of the MFP 110 may display the participation registration screen, and may issue a participation instruction to the cloud server 120.

Figure 14:
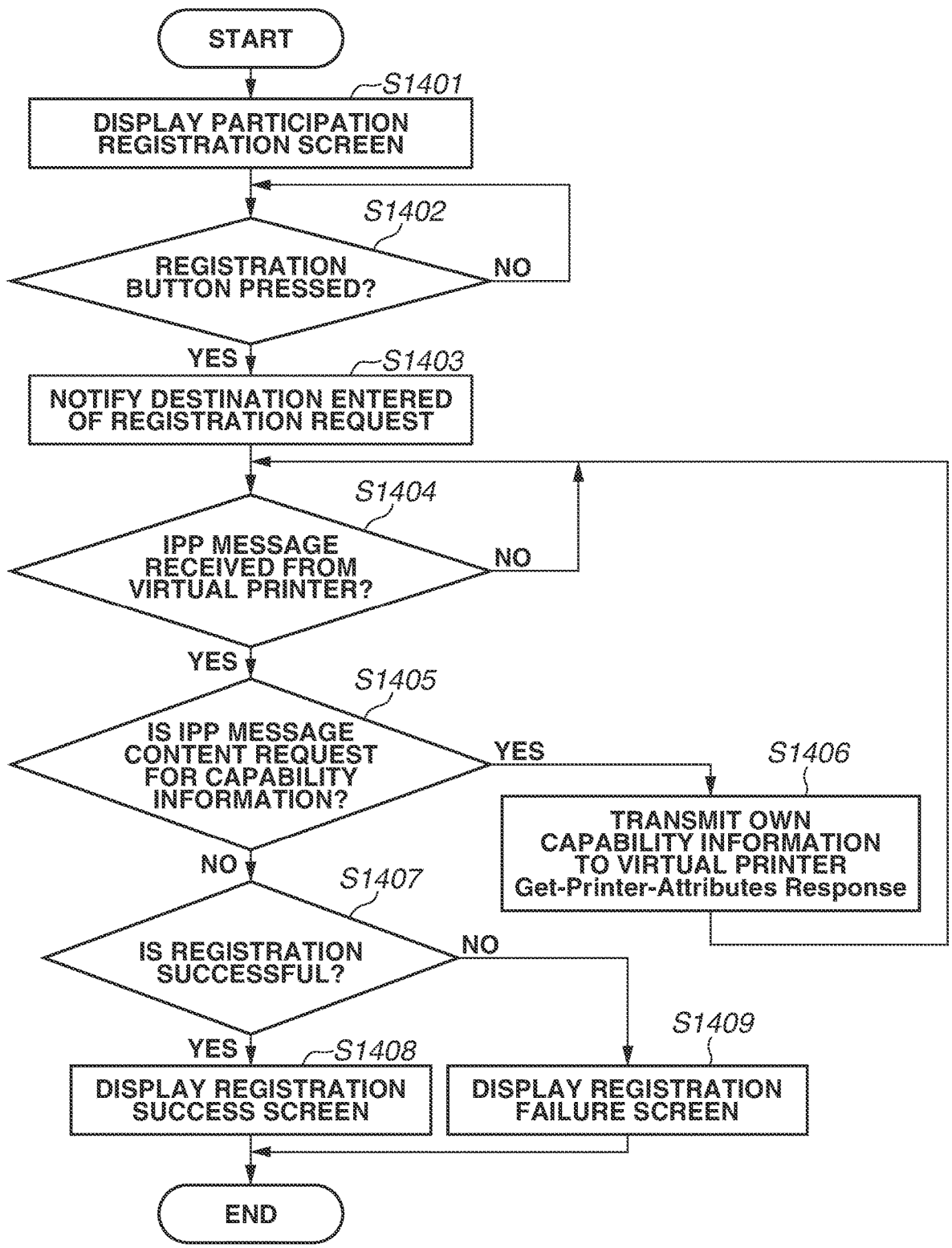
FIG. 14 is a flowchart illustrating an example of processing of registering the MFP on the virtual printer.

FIG. 14 is a flowchart illustrating an example of processing of registering the MFP 111 on the virtual printer. The CPU 201 loads a program stored in the ROM 202 into the RAM 203 and executes the program to perform the processing of the flowchart of FIG. 14. The flow in FIG. 14 starts when an instruction to display the participation registration screen 1300 on the operating unit 208 is received from the user.

In step S1401, the CPU 201 displays the participation registration screen 1300 on the operating unit 208.

In step S1402, the CPU 201 determines whether the registration button 1302 has been selected by the user via the operating unit 208. If it is determined that the registration button 1302 has been selected (YES in step S1402), then the processing proceeds to step S1403. If it is determined that the registration button 1302 has not been selected (NO in step S1402), then the processing returns to step S1402.

In step S1403, the CPU 201 transmits a registration request (Register-Output-Device Request) to the virtual printer based on the identifier (such as a URL) entered in the input field 1301 of the participation registration screen 1300. Here, for convenience, an example of transmission to a virtual printer on the cloud server 120 will be described.

In step S1404, the CPU 201 determines whether an IPP message has been received from the cloud server 120. If it is determined that the IPP message has been received (YES in step S1404), then the processing proceeds to step S1405. If it is determined that the IPP message has not been received (NO in step S1404), then the processing returns to step S1404.

In step S1405, the CPU 201 determines whether the IPP message received in step S1404 is a request for capability information (Get-Printer-Attributes Request). If the PP message is a request for capability information (YES in step S1405), the processing proceeds to step S1406. If the IPP message is not a request for capability information (NO in step S1405), that is, if the IPP message is a registration result notification (Register-Output-Device-Response), the processing proceeds to step S1407.

In step S1406, as a response to the request for capability information received from the cloud server 120, the CPU 201 transmits capability information (Get-Printer-Attributes Response) indicating the capability of the MFP 111. At this time, the IPP message transmitted from the MFP 111 corresponds to the message 1110.

In step S1407, the CPU 201 interprets the IPP message, which is the received registration result notification, to determines whether the MFP 111 has been registered on the virtual printer. Specifically, if the received registration result notification is a message indicating that registration is completed, such as the message 1210, then it is determined that the registration is completed; if the received registration result notification is a message indicating that registration is not performed, such as the message 1220, then it is determined that the registration is not completed. If it is determined that the registration is completed (YES in step S1407), then the processing proceeds to step S1408. If it is determined that the registration is not completed (NO in step S1407), then the processing returns to step S1409.

In step S1408, the CPU 201 displays a screen indicating that the registration is successful on the operating unit 208. The screen displayed at that time is a screen such as the participation registration screen 1310. If the registration is successful, the identifier of the virtual printer is stored in the HDD 204.

In step S1409, the CPU 201 displays on the operating unit 208 a screen indicating that the registration is failed. The screen displayed at that time is a screen such as the participation registration screen 1320.

Figure 15:
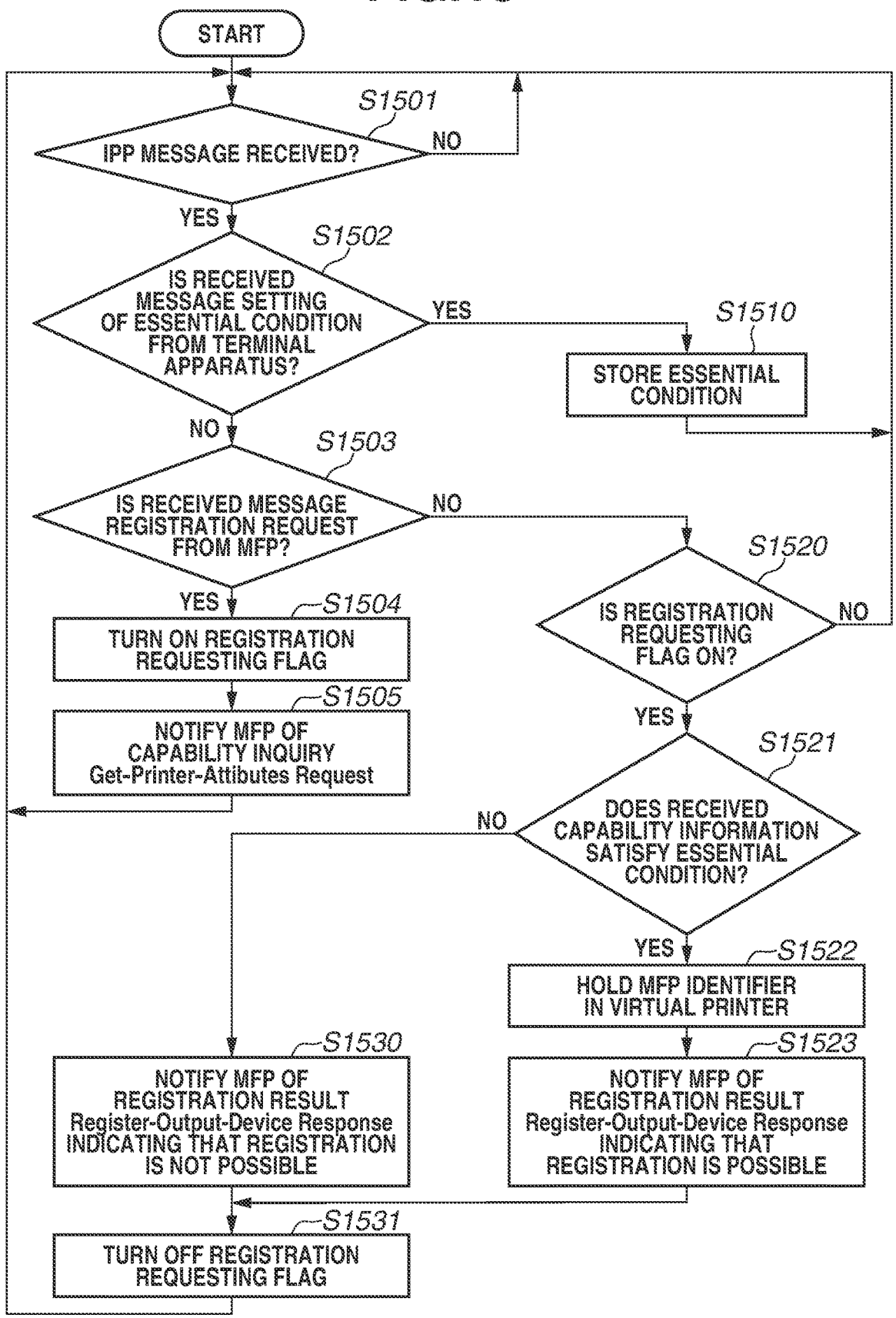
FIG. 15 is a flowchart illustrating an example of processing of registering the MFP by the cloud server 120.

FIG. 15 is a flowchart illustrating an example of processing of registering the MFP 110 by the cloud server 120. The CPU 301 loads a program stored in the ROM 302 into the RAM 303 and executes the program to perform the processing of the flowchart of FIG. 15. The program to be loaded by the CPU 301 into the RAM 303 may be stored in a storage device such as an HDD. The flow of FIG. 15 is started when the cloud server 120 is powered on.

In step S1501, the CPU 301 determines whether an IPP message has been received. If it is determined that the IPP message has been received (YES in step S1501), then the processing proceeds to step S1502. If it is determined that the IPP message has not been received (NO in step S1501), then the processing returns to step S1501.

In step S1502, the CPU 301 determines whether the received IPP message is information indicating the capability information being the essential conditions received from the terminal apparatus 130. If the received IPP message is the capability information being the essential conditions (YES in step S1502), the processing proceeds to step S1510. If the received IPP message is not the capability information being the essential conditions (NO in step S1502), the processing proceeds to step S1503.

In step S1510, the CPU 301 stores, in the HDD 304, the information indicating the capability information being the essential conditions received from the terminal apparatus 130.

In step S1503, the CPU 301 determines whether the received IPP message is a registration request (Register-Output-Device Request) received from the MFP. If the received IPP message is a registration request (YES in step S1503), then the processing proceeds to step S1504. If the received IPP message is not a registration request (NO in step S1503), then the processing proceeds to step S1520.

In step S1504, the CPU 301 turns on a registration requesting flag indicating that the MFP 110 is requesting registration. Specifically, information indicating that registration is being requested is stored in the RAM 303.

In step S1505, the CPU 301 transmits a request for capability information (Get-Printer-Attributes Request) to the MFP that has transmitted the IPP message.

Hereinafter, the case where it is determined that the IPP message is not the registration request received from the MFP in step S1503, that is, the case where the IPP message is the capability information (Get-Printer-Attributes Response) received from the MFP will be described.

In step S1520, the CPU 301 determines whether the registration requesting flag is on. If it is determined that the registration requesting flag is on (YES in step S1520), then the processing proceeds to step S1521. If it is determined that the registration requesting flag is not on (NO in step S1520), then the processing returns to step S1501.

In step S1521, the CPU 301 compares the received capability information (Get-Printer-Attributes Response) with the capability information being the essential conditions stored in the HDD 304 to determine whether the received capability information satisfies the essential conditions. If it is determined that the received capability information satisfies the essential conditions (YES in step S1521), then the processing proceeds to step S1522. If it is determined that the received capability information does not satisfy the essential conditions (NO in step S1521), then the processing proceeds to step S1530.

In step S1522, the CPU 301 stores, in the RAM 303, the identifier of the MFP that has transmitted the capability information (Get-Printer-Attributes Response) to the RAM 303. To store the identifier means to be registered on the virtual printer. An area to store the identifier may be a nonvolatile area such as the HDD 304. Further, the identifier of the MFP may be an identifier as indicated by the IPP message data 1011 or an identifier such as the IP address or the MAC address of the MFP. Here, storing the identifier of the MFP and determining whether the access is from the MFP having the identifier allows only the MFP registered on the virtual printer to execute the print job stored in the HDD 304 in association with the identifier of the virtual printer. As a result, it is not possible to request and execute a print job from the MFP that does not satisfy the essential conditions, and it is possible to reduce the time and effort of the user to check the capability of the MFP.

In addition, if the received capability information satisfies the essential conditions, the cloud server 120 according to the present exemplary embodiment stores the identifier of the MFP that has transmitted the capability information, but the present disclosure is not limited to this. For example, the cloud server 120 may store, in addition to the identifier of the MFP that has transmitted the capability information, received information such as the capability information about the MFP 110, and the name of the MFP. Furthermore, the cloud server 120 may store status information about the MFP. Here, the state information is information indicating whether the MFP to be registered on the virtual printer is to be in an activated state. The MFP in the activated state can receive a print job from the cloud server 120, and the MFP not in the activated state cannot receive a print job from the cloud server 120. Even if the MFP is not activated, the MFP is registered on the virtual printer as an MFP that is not in the activated state.

In step S1523, the CPU 301 transmits, to the MFP that has transmitted the IPP message, a registration result notification (Register-Output-Device Response) indicating that registration is possible.

Hereinafter, the case where it is determined in step S1521 that the essential conditions are not satisfied will be described.

In step S1530, the CPU 301 transmits, to the MFP that has transmitted the IPP message, a registration result notification (Register-Output-Device Response) indicating that registration is not possible.

In step S1531, the CPU 301 turns off the registration requesting flag indicating that the MFP 110 is requesting registration.

The processing described above makes it possible to reduce the time and effort of the user when an image formation apparatus receives a print job stored in an information processing apparatus from the information processing apparatus to execute the print job, in response to a user operation.

Next, a screen displayed on the operating unit 406 of the terminal apparatus 131 at the time of instructing the virtual printer to print will be described with reference to FIG. 19.

FIG. 19 illustrates an example of a print screen displayed on the operating unit 406 of the terminal apparatus 131.

A print setting screen 1900 is displayed on the operating unit 406 of the terminal apparatus 131 and is for generating a print job and transmitting the print job to the cloud server 120 in response to a user operation.

An option button 1901 is a button for displaying a screen for setting a printer to be used, such as a screen 1910, in response to a user selection.

The print setting screen 1910 is a screen for selecting a printer which executes a print job. A check mark is displayed on the left of the selected printer name.

A button 1911 is a button for displaying detailed information about "Virtual Printer www.example.com" in response to a user selection. The screen displayed at that time corresponds to a print setting screen 1920 in FIG. 20.

A button 1912 is a button for displaying detailed information about "Local Printer 1 localprint1" in response to a user selection.

FIG. 20 illustrates an example of a print setting screen for displaying detailed information about a printer.

The print setting screen 1920 is displayed when the button 1911 is selected, and displays detailed information about "Virtual Printer www.example.com".

An item 1921 indicates how "Virtual Printer www.example.com" is connected to the terminal apparatus 131. An item 1922 indicates the URL of "Virtual Printer www.example.com". An item 1923 indicates a list of printers participating in the virtual printer if the selected printer is a virtual printer such as "Virtual Printer www.example.com".

A print button 1902 is a button for transmitting, to the selected printer, a print job that includes print settings set on the print setting screen 1920 and image data selected by the user to cause the printer to execute printing processing, in response to a user selection.

A printer button 1903 is a button for displaying the print setting screen 1920 for displaying detailed information about the printer, in response to a user selection.

In the first exemplary embodiment, when registering the MFP 110 on the virtual printer, the administrator of the MFP 110 needs to operate the participation registration screen 1300 displayed on the operating unit 208 of the MFP 110. In a second exemplary embodiment, an example in which the MFP 110 is registered on the virtual printer via the terminal apparatus 130 connected to the MFP 110 instead of the operating unit 208 will be described focusing on the differences from the first exemplary embodiment.

Figure 16:
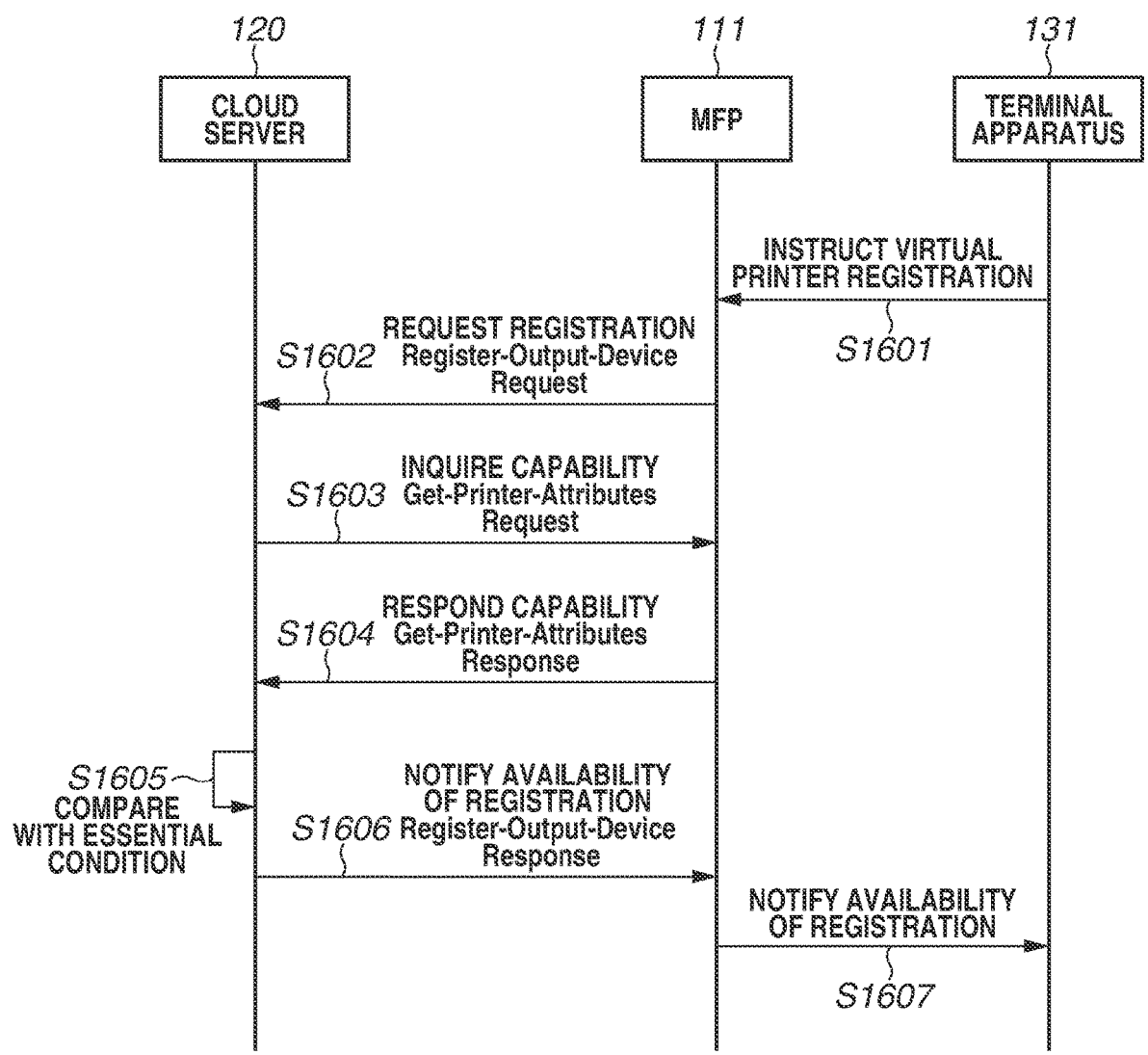
FIG. 16 is a flow diagram illustrating an example of a sequence to register the MFP on the virtual printer via the terminal apparatus.

FIG. 16 illustrates an example of a sequence to register the MFP 111 on the virtual printer via the terminal apparatus 131. Hereinafter, for convenience, the terminal apparatus 131 will be described as an example of the terminal apparatus 130, and the MFP 111 will be described as an example of the MFP 110.

In step S1601, in response to a user operation on the participation registration screen displayed on the operating unit 406 of the terminal apparatus 130, the CPU 401 of the terminal apparatus 131 instructs the MFP 110 to transmit a registration request to the virtual printer. The participation registration screen displayed on the operating unit 406 of the terminal apparatus 131 may be a screen such as the participation registration screen 1300 in FIG. 13.

The processing of steps S1602 to S1606 are the same as the processing of steps S704 to S708, and thus the description thereof is omitted.

In step S1607, the CPU 201 of the MFP 111 transmits the received registration result notification to the terminal apparatus 131. When receiving the registration result notification, the terminal apparatus 131 displays a screen such as the participation registration screen 1310 or 1320 based on the result.

The processing described above enables even an image formation apparatus having no operating unit to be registered on the virtual printer.

In the first and second exemplary embodiments, examples in which the MFP 110 is not registered if the MFP 110 does not satisfy the capability being the essential conditions set in the virtual printer have been described. However, the essential conditions set for the virtual printer are not absolute but may be conditions to be recommended. In such an operation, even if the capability of the MFP 110 does not satisfy the capability of the conditions set in the virtual printer, there is a possibility that the MFP 110 is registered on the virtual printer, taking that into account. Therefore, in a third exemplary embodiment, an example in which even the MFP 110 which does not satisfy the capability being the essential conditions can be forcibly registered will be described focusing on the differences from the first and second exemplary embodiments.

Figure 17:
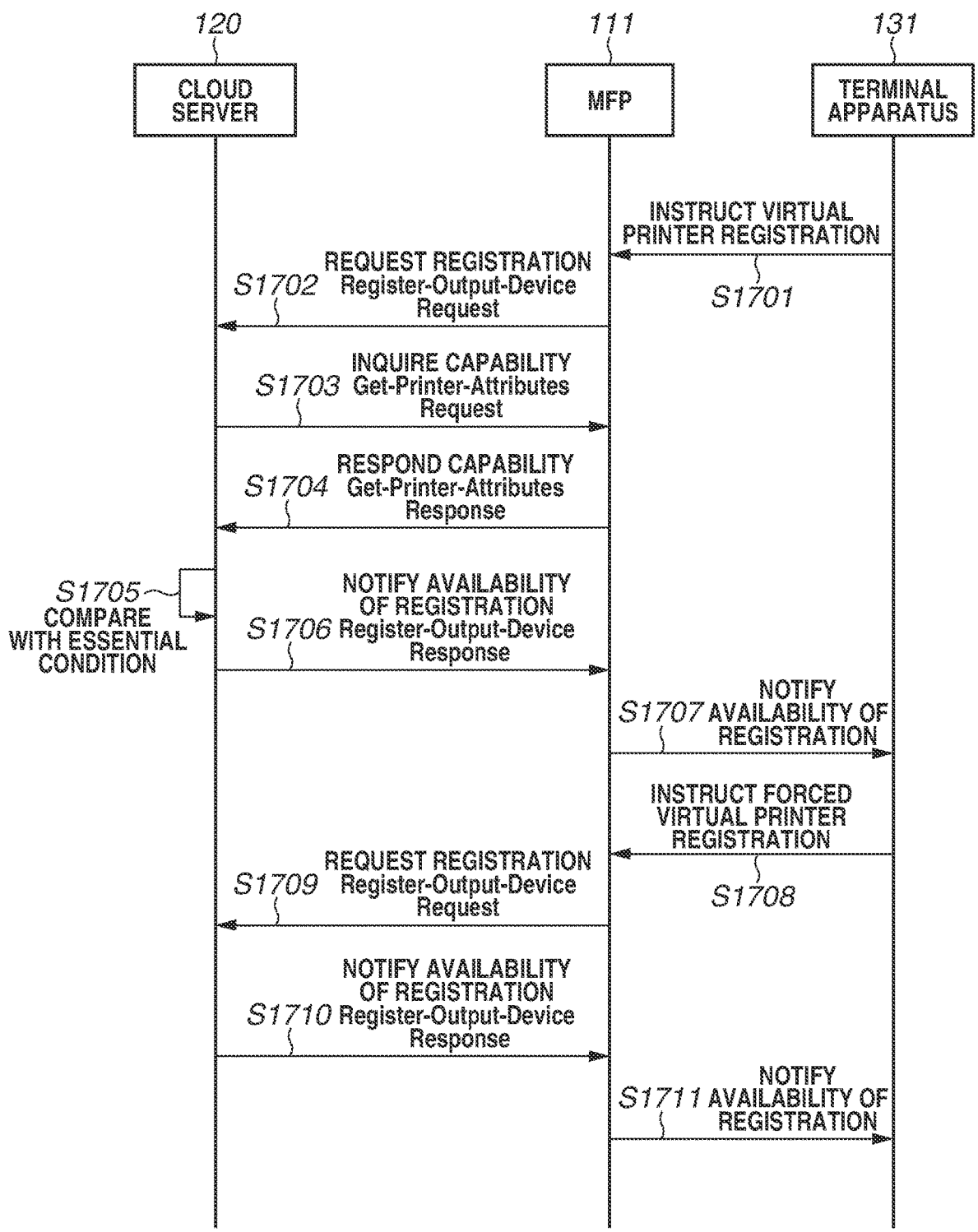
FIG. 17 is a flow diagram illustrating another example of a sequence to register the MFP on the virtual printer via the terminal apparatus.

FIG. 17 illustrates another example of a sequence to register the MFP 111 on the virtual printer via the terminal apparatus 131. Hereinafter, for convenience, the terminal apparatus 131 will be described as an example of the terminal apparatus 130, and the MFP 111 will be described as an example of the MFP 110.

The processing of steps S1701 to S1707 are the same as the processing of steps S1601 to S1607 in the sequence of FIG. 16, and thus, the description thereof is omitted.

In the present sequence, the registration result notification transmitted in the processing of step S1707 indicates that registration is not possible.

In step S1708, the CPU 401 of the terminal apparatus 131 transmits, to the MFP 111, information indicating an instruction to forcibly perform registration on the virtual printer, in response to a user operation using the operating unit 406. The user operation using the operating unit 406 is, for example, that the registration button 1302 is selected again on the participation registration screen 1320 displayed on the operating unit 406. A dedicated button for forcibly registering for participation may be displayed on the participation registration screen 1320, and the processing of S1708 may be executed by selecting the button.

In step S1709, the CPU 201 of the MFP 111 transmits a registration request (Register-Output-Device Request) to the cloud server 120. An example of the IPP message of the registration request (Register-Output-Device Request) transmitted at that time will be described with reference to FIG. 18.

FIG. 18 illustrates an example of a message used for transmitting a printer registration request in PP communication between the cloud server 120 and the MFP 111.

An IPP message 1800 is a message indicating the registration request transmitted in step S1709. The IPP message 1800 includes IPP message data 1801 and 1802.

In the IPP message data 1801, "ipp://XXXXX.local.:631/ipp/printer" indicates the identifier of the MFP 111.

In the IPP message data 1802, "force-regist-mode (boolean): true" indicates that the request is a forced registration request.

The processing of steps S1710 and S1711 are the same as the processing of steps S1606 and S1607, and thus the description thereof is omitted. In step S1711, only the registration result notification indicating that the registration is possible is transmitted.

The processing described above makes it possible to forcibly register even the MFP 110 which does not satisfy the capability being the essential conditions.

Other Embodiments

The subject matter of one aspect of the present disclosure is achieved by performing the following processing. That is, in the processing, a storage medium storing a program code for implementing the functions of the above-described exemplary embodiments is supplied to a system or an apparatus, and then a computer (, CPU, microprocessing unit (MPU), or the like) of the system or the apparatus loads the program code stored in the storage medium. In this case, the program code itself loaded from the storage medium implements the functions of the above-described exemplary embodiments, and the program code constitutes one aspect of the present disclosure.

Embodiments of the present disclosure also include the case where the functions of the above-described exemplary embodiments are implemented by executing the program code loaded by a computer. In addition, embodiments of the present disclosure include the case where an operating system (OS) or another application running on the computer performs a part or all of the actual processing based on the instruction of the program code, and the functions of the above-described exemplary embodiments are implemented by such a processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-177273, filed Sep. 21, 2018, which is hereby incorporated by reference herein in its entirety.

What is claimed is:

1. A server system comprising:
   a setting unit configured to set, based on a user instruction, one or more conditions of capability of an image formation apparatus, wherein information about the image formation apparatus is able to be registered in association with an identifier;
   a first reception unit configured to receive a first request for registering the information about the image formation apparatus in association with the identifier, and a capability of the image formation apparatus, from the image formation apparatus;
   a registration unit configured to register, in association with the identifier specified based on the first request, the information about the image formation apparatus, the capability of the image formation apparatus satisfying the set one or more conditions;
   a second reception unit configured to receive print data specifying the identifier as a destination from a terminal apparatus;
   a third reception unit configured to receive a second request for transmitting the print data from the image formation apparatus, the information about the image formation apparatus having been registered in association with the identifier; and
   a transmission unit configured to transmit the print data received from the terminal apparatus to the image formation apparatus having transmitted the second request.

2. The server system according to claim 1, wherein the registration unit registers the information about the image formation apparatus in association with the identifier in a case where the received capability of the image formation apparatus satisfies the set one or more conditions, in response to the received first request.

3. The server system according to claim 1, further comprising a notification unit configured to notify the image formation apparatus of information indicating whether registration of the information about the image formation apparatus in association with the identifier by the registration unit is successful.

4. The server system according to claim 1, wherein the image formation apparatus is an image formation apparatus compatible with a predetermined printing protocol.

5. The server system according to claim 4, wherein the predetermined printing protocol is the Internet Printing Protocol (IPP).

6. The server system according to claim 1, wherein the identifier is an identifier of a virtual printer communicable with a plurality of image formation apparatuses.

7. The server system according to claim 1, wherein the registration unit does not register the information about the image formation apparatus, the capability of the image formation apparatus not satisfying the set one or more conditions.

8. The server system according to claim 1, further comprising:
a determination unit configured to determine whether the received capability of the image formation apparatus satisfies the set one or more conditions,
wherein the registration unit registers the information about the image formation apparatus in association with the identifier based on determination, by the determination unit, that the capability of the image formation information satisfies the set one or more conditions.

9. The server system according to claim 8, wherein in a case where the determination unit determines that the capability received from the image formation apparatus does not satisfy the set one or more conditions, the registration unit does not register the information about the image formation apparatus in association with the identifier.

10. A method for controlling a server system, the method comprising:
setting, based on a user instruction, one or more conditions of capability of an image formation apparatus in association with an identifier, wherein information about the image formation apparatus is able to be registered;
performing first reception of receiving a first request for registering the information about the image formation apparatus in association with the identifier, and a capability of the image formation apparatus, from the image formation apparatus;
registering, in association with the identifier specified based on the first request, the information about the image formation apparatus, the capability of the image formation apparatus satisfying the set one or more conditions;
performing second reception of receiving print data specifying the identifier as a destination from a terminal apparatus;
performing third reception of receiving a second request for transmitting the print data from the image formation apparatus, the information about the image formation apparatus having been registered in association with the identifier; and
transmitting the print data received from the terminal apparatus to the image formation apparatus having transmitted the second request.

11. A non-transitory computer-readable storage medium storing a program that, when executed by a computer, causes the computer to perform the method according to claim 10.

* * * * *